(12) United States Patent
Mao et al.

(10) Patent No.: US 12,055,712 B2
(45) Date of Patent: Aug. 6, 2024

(54) MULTI-FOCAL-PLANE IMAGE GENERATION APPARATUS, HEAD-UP DISPLAY APPARATUS, RELATED METHOD, AND DEVICE

(71) Applicant: HUAWEI TECHNOLOGIES CO., LTD., Guangdong (CN)

(72) Inventors: Lei Mao, Dongguan (CN); Tianhai Chang, Dongguan (CN); Shimao Li, Dongguan (CN); Zhiyong Huang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/986,381

(22) Filed: Nov. 14, 2022

(65) Prior Publication Data

US 2023/0073664 A1    Mar. 9, 2023

Related U.S. Application Data

(63) Continuation of application No. PCT/CN2021/081943, filed on Mar. 20, 2021.

(30) Foreign Application Priority Data

May 15, 2020    (CN) .......................... 202010415276.1

(51) Int. Cl.
*G02B 27/01*    (2006.01)
*B60K 35/00*    (2006.01)
(Continued)

(52) U.S. Cl.
CPC .......... *G02B 27/0101* (2013.01); *B60K 35/00* (2013.01); *G02B 27/286* (2013.01);
(Continued)

(58) Field of Classification Search
CPC .. G09G 3/002; G09G 2380/10; G02B 27/286; G02B 27/0101; B60K 35/23; B60K 35/00; B60K 2360/23
See application file for complete search history.

(56) References Cited

U.S. PATENT DOCUMENTS 9,030,749 B2    5/2015  Lescure et al.
2007/0279618 A1  12/2007  Sano et al.
(Continued)

FOREIGN PATENT DOCUMENTS

CN    101416096 A    4/2009
CN    103140791 A    6/2013
(Continued)

OTHER PUBLICATIONS

Extended European Search Report in European Appln No. 21803257. 1, dated Sep. 8, 2023, 8 pages.
(Continued)

*Primary Examiner* — Abbas I Abdulselam
(74) *Attorney, Agent, or Firm* — Fish & Richardson P.C.

(57) ABSTRACT

This application provides example multi-focal-plane image generation apparatuses, example head-up display apparatuses, example methods, and example devices. One example apparatus includes a pattern generation device and a focal length adjuster. The pattern generation device is configured to generate a light beam that carries image information, and irradiate the light beam to a surface of the focal length adjuster. The focal length adjuster is configured to perform focal length adjustment on the light beam that is irradiated to the surface of the focal length adjuster to generate a plurality of focal planes of the multi-focal-plane image generation apparatus.

20 Claims, 6 Drawing Sheets

(51) Int. Cl.
  *G02B 27/28*   (2006.01)
  *G09G 3/00*    (2006.01)
  *B60K 35/23*   (2024.01)
(52) U.S. Cl.
  CPC .............. *G09G 3/002* (2013.01); *B60K 35/23* (2024.01); *B60K 2360/23* (2024.01); *G02B 2027/0123* (2013.01); *G09G 2380/10* (2013.01)

(56) References Cited

U.S. PATENT DOCUMENTS

| | | | |
|---|---|---|---|
| 2016/0003636 A1 | 1/2016 | Ng-Thow-Hing et al. | |
| 2016/0291327 A1* | 10/2016 | Kim | G02B 27/0176 |
| 2017/0329143 A1 | 11/2017 | Svarichevsky et al. | |
| 2019/0265468 A1 | 8/2019 | Hirata et al. | |
| 2019/0302464 A1 | 10/2019 | Li | |
| 2019/0331957 A1* | 10/2019 | Aoki | H04N 9/3194 |
| 2019/0384059 A1 | 12/2019 | Meijering et al. | |
| 2021/0310789 A1* | 10/2021 | Kim | G01B 9/02028 |

FOREIGN PATENT DOCUMENTS

| | | | |
|---|---|---|---|
| CN | 103323947 A | 9/2013 |
| CN | 106662683 A | 5/2017 |
| CN | 106842880 A | 6/2017 |
| CN | 106896506 A | 6/2017 |
| CN | 107065124 A | 8/2017 |
| CN | 108399903 A | 8/2018 |
| CN | 109031676 A | 12/2018 |
| CN | 109557653 A | 4/2019 |
| CN | 110308566 A | 10/2019 |
| CN | 110554497 A | 12/2019 |
| JP | 2013024921 A | 2/2013 |
| JP | 2018128531 A | 8/2018 |
| WO | 2014024745 A1 | 2/2014 |
| WO | 2017064797 A1 | 4/2017 |
| WO | 2019238889 A1 | 12/2019 |

OTHER PUBLICATIONS

Office Action in Chinese Appln. No. 202010415276.1, dated Jul. 22, 2022, 7 pages.
International Search Report and Written Opinion in International Appln. No. PCT/CN2021/081943, dated May 26, 2021, 16 pages (with English translation).
Office Action in Japanese Appln. No. 2022-569196, mailed on Nov. 21, 2023, 10 pages (with English translation).

* cited by examiner

MULTI-FOCAL-PLANE IMAGE GENERATION APPARATUS, HEAD-UP DISPLAY APPARATUS, RELATED METHOD, AND DEVICE

CROSS-REFERENCE TO RELATED APPLICATIONS

This application is a continuation of International Application No. PCT/CN2021/081943, filed on Mar. 20, 2021, which claims priority to Chinese Patent Application No. 202010415276.1, filed on May 15, 2020. The disclosures of the aforementioned applications are hereby incorporated by reference in their entireties.

TECHNICAL FIELD

This application relates to the field of image display technologies, and in particular, to a multi-focal-plane image generation apparatus, a head-up display apparatus, and a related method.

BACKGROUND

Figure 1:
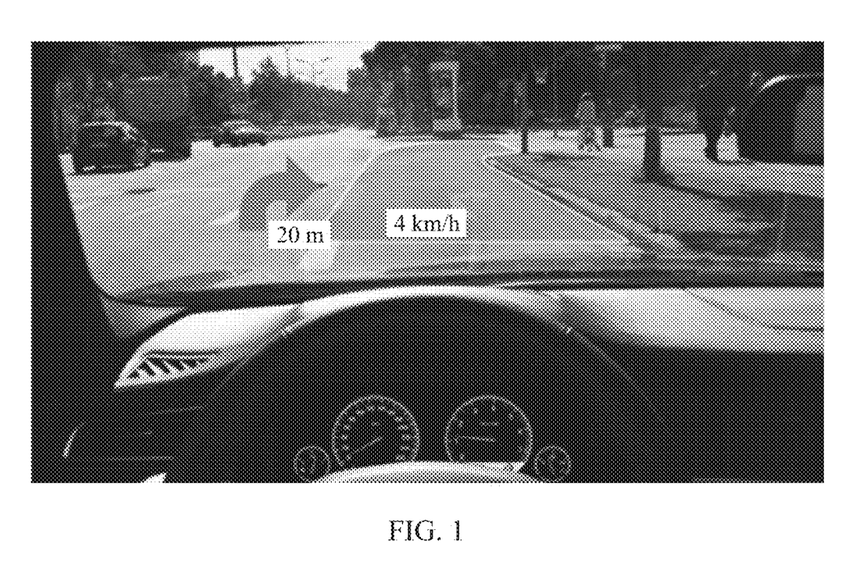
FIG. 1 is a schematic diagram of a display interface of an HUD.

A head-up display (HUD) is also referred to as a parallel display system, and refers to a multi-function dashboard that is centered on a driver. A function of the head-up display is to project important driving information such as a speed and navigation information onto a windshield in front of the driver, so that the driver can see the important driving information such as the speed and the navigation information as much as possible without lowering the driver's head or turning the driver's head. FIG. 1 is a schematic diagram of a display interface of an HUD. As shown in FIG. 1, an image displayed by the HUD includes information such as a speed "4 km/h" and navigation information "arrow indicating to turn right 20 m ahead", However, an image displayed on a common HUD and an object on an actual road are not on a same focal plane, and consequently eyes of the driver need to roll back and forth between the object on the road and an HUD imaging plane to adjust a focus of the eyes. Although the current HUD resolves a problem of lowering the head, frequent focus adjustment causes visual fatigue, reducing user experience. To implement a real HUD based on augmented reality (AR), a technical problem of multi-focal-plane imaging of an image generation apparatus needs to be resolved.

SUMMARY

This application provides a multi-focal-plane image generation apparatus, a head-up display apparatus, and a related method. A main purpose is to resolve a technical problem of multi-focal-plane imaging of an image generation apparatus, so that any focal length can be continuously adjusted.

According to a first aspect, this application provides a multi-focal-plane image generation apparatus, where the apparatus includes a pattern generation unit and a focal length adjuster. The pattern generation unit is configured to: generate a light beam that carries image information, and irradiate the light beam to a surface of the focal length adjuster. The focal length adjuster is configured to perform focal length adjustment on the light beam that is irradiated to the surface of the focal length adjuster, to generate a plurality of focal planes of the multi-focal-plane image generation apparatus.

In the technical solution of this application, transformation and upgrade may be performed based on an optical path of the pattern generation unit, and implementation is simple. A focal length is flexibly adjusted by using the focal length adjuster, so that any focal length can be continuously adjusted, and any quantity of focal planes (or imaging planes) at any position can be implemented.

In a possible implementation, the focal length adjuster loads different phase information, so that the multi-focal-plane image generation apparatus generates the plurality of focal planes. The different phase information corresponds to different focal planes.

In the technical solution of this application, the focal length adjuster adjusts the focal length by loading phase information, to control a quantity of focal planes and a position of the focal plane, so that flexibility is high.

In a possible implementation, the focal length adjuster includes a plurality of imaging areas, and different imaging areas correspond to different focal planes. The imaging areas of the focal length adjuster may be obtained through division by using software, any boundary shape is supported, and flexibility is high.

In a possible implementation, phase information that is loaded in the different imaging areas is different. The different phase information is loaded in the different imaging areas, so that images on different focal planes can be displayed in different areas.

In a possible implementation, the focal length adjuster is disposed behind an imaging plane of the pattern generation unit, or the focal length adjuster is disposed at an imaging plane of the pattern generation unit, or the focal length adjuster is disposed in front of an imaging plane of the pattern generation unit. A position of the focal length adjuster may be flexibly disposed, provided that the light beam generated by the pattern generation unit can be received by the focal length adjuster.

In a possible implementation, the phase information that is loaded by the focal length adjuster includes a phase distribution of a Fresnel lens or a phase distribution of a Zernike lens. A focal length of an equivalent lens can be changed by changing a phase distribution pattern of the Fresnel lens or the Zernike lens that is loaded on the focal length adjuster, to control the multi-focal-plane image generation apparatus to generate a plurality of continuous focal planes.

In a possible implementation, the focal length adjuster is a spatial light modulator. The spatial light modulator may be a phase-type spatial light modulator, and may be implemented based on a liquid crystal or a microelectromechanical system.

In a possible implementation, a polarizer is disposed in front of the focal length adjuster, and the polarizer is configured to align a polarization state of the light beam with a direction of an alignment layer of the focal length adjuster.

According to a second aspect, this application provides a multi-focal-plane image generation method, where the method is applied to a multi-focal-plane image generation apparatus, and the multi-focal-plane image generation apparatus includes a pattern generation unit and a focal length adjuster. The method includes: generating, by using the pattern generation unit, a light beam that carries image information, and irradiating the light beam to a surface of the focal length adjuster; and performing, by using the focal length adjuster, focal length adjustment on the light beam that is irradiated to the surface of the focal length adjuster, to generate a plurality of focal planes of the multi-focal-plane image generation apparatus, In the technical solution of this application, transformation and upgrade may be performed based on an optical path of the pattern generation unit, and implementation is simple. A focal length position is flexibly adjusted by using the focal length adjuster, so that any focal length can be continuously adjusted, and any quantity of focal planes (or imaging planes) at any position can be implemented.

In a possible implementation, the performing focal length adjustment on the light beam that is irradiated to the surface of the focal length adjuster, to generate a plurality of focal planes of the multi-focal-plane image generation apparatus includes: loading different phase information on the focal length adjuster, so that the multi-focal-plane image generation apparatus generates the plurality of focal planes. The different phase information corresponds to different focal planes.

In the technical solution of this application, the focal length adjuster adjusts the focal length by loading phase information, to control a quantity of focal planes and a position of the focal plane, so that flexibility is high.

In a possible implementation, the method includes: dividing the focal length adjuster into a plurality of imaging areas, where different imaging areas correspond to different focal planes. The imaging areas of the focal length adjuster may be obtained through division by using software, any boundary shape is supported, and flexibility is high.

In a possible implementation, different phase information is loaded in the different imaging areas. The different phase information is loaded in the different imaging areas, so that images on different focal planes can be displayed in different areas.

In a possible implementation, the phase information that is loaded by the focal length adjuster includes a phase distribution of a Fresnel lens or a phase distribution of a Zernike lens. A focal length of an equivalent lens can be changed by changing a phase distribution pattern of the Fresnel lens or the Zernike lens that is loaded on the focal length adjuster, to control the multi-focal-plane image generation apparatus to generate a plurality of continuous focal planes.

In a possible implementation, the focal length adjuster is a spatial light modulator. The spatial light modulator may be a phase-type spatial light modulator, and may be implemented based on a liquid crystal or a microelectromechanical system.

In a possible implementation, a polarization state of the light beam is aligned with a direction of an alignment layer of the focal length adjuster through a polarizer, and the polarizer is disposed in front of the focal length adjuster.

According to a third aspect, this application provides a head-up display apparatus, where the head-up display apparatus includes the multi-focal-plane image generation apparatus in any one of the first aspect or be possible implementations of the first aspect and an imaging component. The multi-focal-plane image generation apparatus is configured to generate a plurality of images, the multi-focal-plane image generation apparatus has a plurality of focal planes, and different focal planes correspond to different images in the plurality of images. The imaging component is configured to perform imaging for the plurality of images, for reception by a human eye.

The technical solution of this application may also be applied to display apparatuses such as a flat glass display and a projector, in addition to the head-up display device. A continuously adjustable focal plane is generated through a multi-focal-plane image unit, so that different information can be presented on different imaging planes, improving user experience.

According to a fourth aspect, this application provides a driving device, including: a cockpit, a windshield that is installed in front of the cockpit, and the head-up display apparatus in the third aspect, where the head-up display apparatus is installed in the cockpit, and the windshield performs reflection and imaging on an image that is generated by the head-up display apparatus.

The technical solution of this application may resolve a technical problem of multi-focal-plane imaging of in-vehicle head-up display. There is no need for a user to frequently adjust a focus in a driving process, improving user experience.

DESCRIPTION OF EMBODIMENTS

Embodiments of this application relate to a multi-focal-plane image generation apparatus, a head-up display apparatus, and a related method, which are described in detail below with reference to the accompanying drawings.

Figure 2:
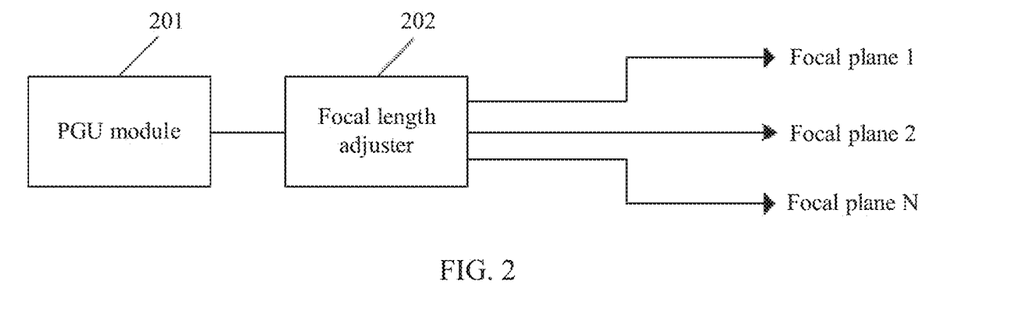
FIG. 2 is a schematic diagram of a structure of a multi-focal-plane image generation apparatus according to this application.

FIG. 2 is a schematic diagram of a structure of a multi-focal-plane image generation apparatus according to this application. As shown in FIG. 2, the multi-focal-plane image generation apparatus includes a pattern generation unit (PGU) module 201 and a focal length adjuster 202. The PGU module 201 may include a light source and an imaging component, and the light source is configured to generate a light beam that carries image information. The imaging component may include a lens, a lens group, or the like. The light beam that is generated by the light source is imaged, so that the multi-focal-plane image generation apparatus generates different focal planes (a focal plane 1, a focal plane 2, . . . , and a focal plane N), and the plurality of focal planes may be continuously adjustable. The focal length adjuster 202 may be a spatial light modulator (SLM), and the SLM may be implemented based on transparent dielectric components, liquid crystals on silicon (LCoS), microelectromechanical systems (MEMS), piezoelectric ceramics, or the like with different thicknesses. A phase hologram of any phase distribution is loaded by the SLM, so that a position of a focal plane can be changed. Any focal length can be continuously adjusted without changing a physical position of the imaging component on an optical path, so that a continuously variable imaging plane is generated. The "focal plane" and the "imaging plane" in this application may refer to a same spatial position, namely, a position of light beam imaging. When a focal length of the SLM changes, the focal plane or the imaging plane changes accordingly.

Figure 3:
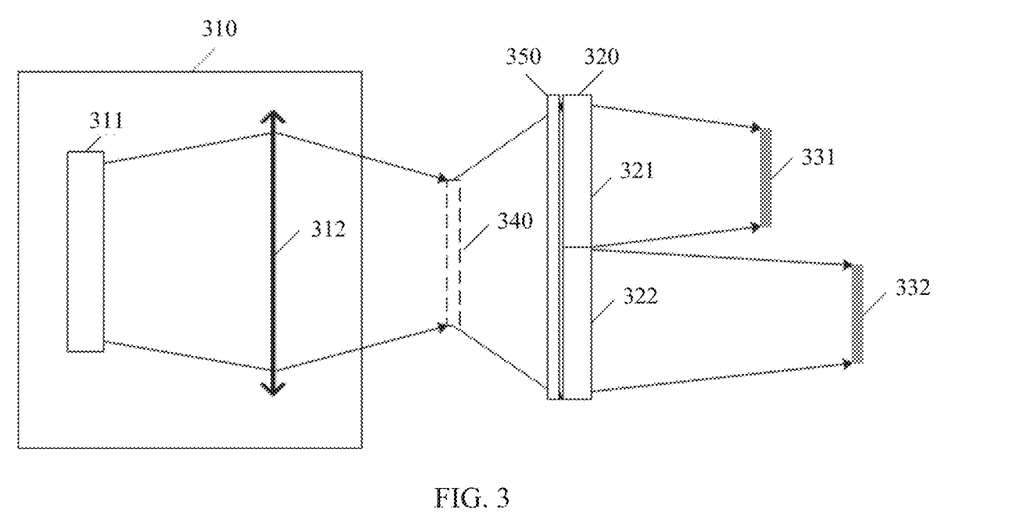
FIG. 3 is a schematic diagram of a structure of a multi-focal-plane image generation apparatus according to this application.

FIG. 3 is a schematic diagram of a structure of a multi-focal-plane image generation apparatus according to this application. As shown in FIG. 3, the multi-focal-plane image generation apparatus may include a PGU module 310 and a spatial light modulator 320. Optionally, an imaging screen 331 and an imaging screen 332 may be disposed at focal planes for the multi-focal-plane image generation apparatus. The imaging screen 331 and the imaging screen 332 each may be implemented by using a diffusing screen, a curtain, white paper, or the like, and may be disposed at a position of a focal plane (or an imaging plane), to receive an image on the focal plane. The PGU module 310 may include an amplitude imaging unit 311 and an imaging component 312. The amplitude imaging unit 311 may be a monochromatic light source or a polychromatic light source. The imaging component 312 may be a leas or a lens group. The PGU module 310 is configured to generate a light beam that carries image information and form an imaging plane 340 at a spatial position. The spatial light modulator 320 may be disposed behind the imaging plane 340 of the PGU module 310. The light beam diffuses after leaving the imaging plane 340, and irradiates a surface of the spatial light modulator 320 after diffusing fully and evenly, that is, the light beam is received by the spatial light modulator 320 after diffusing. The spatial light modulator 320 may be reflective or transmissive, and may be implemented based on a transparent dielectric component, an LCoS, an MEMS, a piezoelectric ceramic, or the like. Optionally, a polarizer 350 is placed in front of the spatial light modulator 320, so that a polarization state of an incident light beam on the surface of the spatial light modulator is aligned with a direction of an alignment layer of the spatial light modulator. When the spatial light modulator 320 is integrated with a polarizer, no additional polarizer needs to be placed. A phase distribution may be loaded on the spatial light modulator, to implement a function of an equivalent lens to aggregate the light beam, so that images are formed on the imaging screen 331 and the imaging screen 332. Positions of the imaging screen 331 and the imaging screen 332 can be changed by adjusting an equivalent lens focal length of the spatial light modulator 320, so that the positions of the imaging screen 331 and the imaging screen 332 can be arbitrarily adjusted. For example, the surface of the spatial light modulator 320 may be divided into an imaging area 321 and an imaging area 322, and Fresnel lens phase distributions with different focal lengths are separately loaded in the imaging area 321 and the imaging area 322, so that a light beam passing through the imaging area 321 is imaged on the imaging screen 331, and a light beam passing through the imaging area 322 is imaged on the imaging screen 332. A complete image generated by the PGU module 310 may be observed on both the imaging screen 331 and the imaging screen 332. A lens focal length on the spatial light modulator may be arbitrarily adjusted. Therefore, an imaging plane is formed at any position in space, so that a position of an imaging screen can be arbitrarily adjusted.

In this embodiment of this application, the spatial light modulator loads phase information, to control a quantity of focal planes and a position of the focal plane, so that flexibility is high. A focal length is flexibly adjusted by using the spatial light modulator, so that any focal length can be continuously adjusted, and any quantity of focal planes (or imaging planes) at any position can be implemented.

Figure 4A:
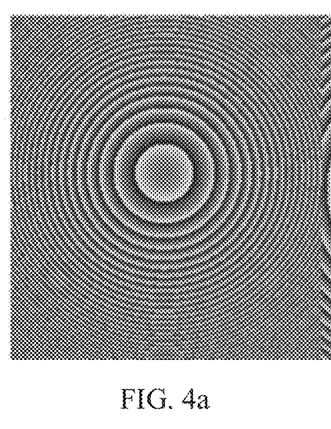
FIG. 4a and FIG. 4b each are a diagram of a phase distribution of a Fresnel lens according to this application.
Figure 4B:
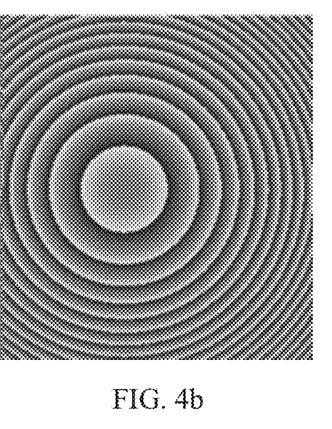

With reference to a specific example, a principle in which a spatial light modulator adjusts a position of an imaging screen is described below. FIG. 4a and FIG. 4b each are a diagram of a phase distribution of a Fresnel lens according to this application. When phase distributions of Fresnel lenses with two different focal lengths shown in FIG. 4a and FIG. 4b are separately loaded in the imaging area 321 and the imaging area 322 on the surface of the spatial light modulator, two different focal planes may be formed, that is, the imaging screen 331 and the imaging screen 332 may be separately adjusted to two different focal planes. The phase distribution of the Fresnel lens is loaded on the surface of the spatial light modulator to control a light field, to achieve a function equivalent to a function of the lens. A radius rm of the $m^{th}$ ring of a Fresnel phase is equal to $(2\, mf\lambda)/2$, where $\lambda$ is a wavelength of incident light, and f is an equivalent lens focal length in a phase of the $m^{th}$ ring. It can be learned that the spatial light modulator can implement functions of lenses with different focal lengths by loading different phase distributions, to adjust positions of a focal plane and an imaging screen.

Figure 5A:
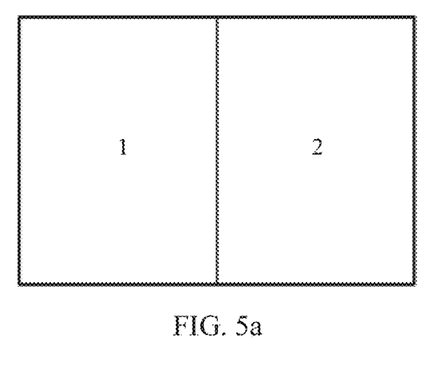
FIG. 5a to FIG. 5d are schematic diagrams of imaging area division of four spatial light modulators according to this application.
Figure 5B:
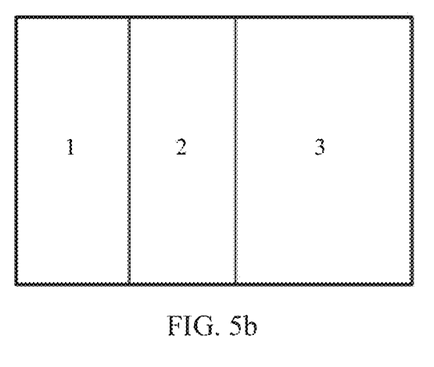
Figure 5C:
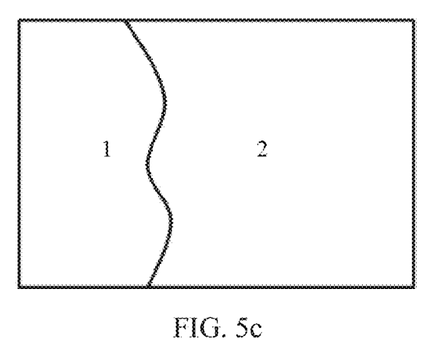
Figure 5D:
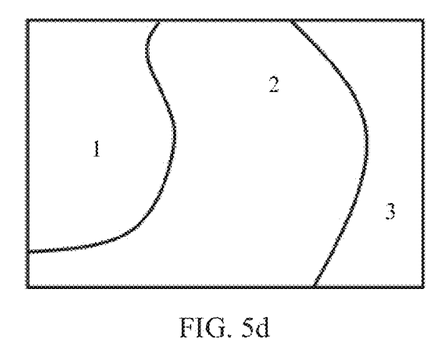

The surface of the spatial light modulator may be divided into any quantity of imaging areas with any shapes through software, and different phase distributions are loaded in different areas, to form different focal planes. FIG. 5a to FIG. 5d are schematic diagrams of imaging area division of four spatial light modulators according to this application. As shown in FIG. 5a, a surface of a spatial light modulator is divided into two rectangular areas. As shown in FIG. 5b, a surface of a spatial light modulator is divided into three rectangular areas. As shown in FIG. 5c, a surface of a spatial light modulator is divided into two irregular areas. As shown in FIG. 5d, a surface of a spatial light modulator is divided into three irregular areas. In addition to the division manners shown in FIG. 5a to FIG. 5d, a surface of a spatial light modulator may be alternatively divided into N imaging areas such as a square, a sector, a triangle, a circle, and a polygon. A pattern with a gray scale of 0 to 255 (corresponding to a phase depth of 0 to $2\pi$) is loaded on the surface of the spatial light modulator, and a phase distribution of a lens with a different focal length may be loaded in each imaging area. For example, phase distributions of Zernike lenses or phase distributions of Fresnel lenses are loaded in all imaging areas of the spatial light modulator, and these phase distributions may be implemented through holographic imaging functions such as a Zernike function and a Fresnel lens function. Different focal planes are generated in different areas, and an image formed on each focal plane may be a 2D image. The areas of the spatial light modulator may be obtained through division by using software, any boundary shape is supported, and flexibility is high. A surface area of the spatial light modulator may be flexibly divided into any quantity of imaging areas with any shapes and any focal lengths, to implement any adjustable multi-focal-plane system. A quantity of imaging areas, a shape of an imaging area, and a focal length of an imaging area may be determined by environmental factors (such as a vehicle, a pedestrian, and a road condition) in a traveling process of a vehicle, so that different information is imaged on different focal planes.

Figure 6A:
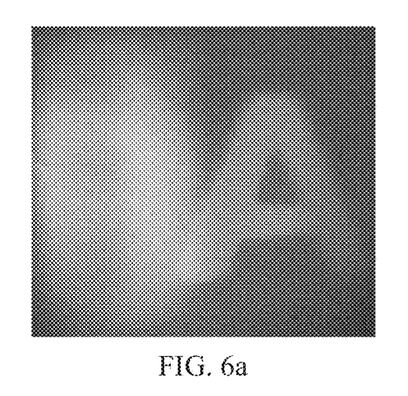
FIG. 6a and FIG. 6b are schematic diagrams of dual-focal-plane imaging according to this application.
Figure 6B:
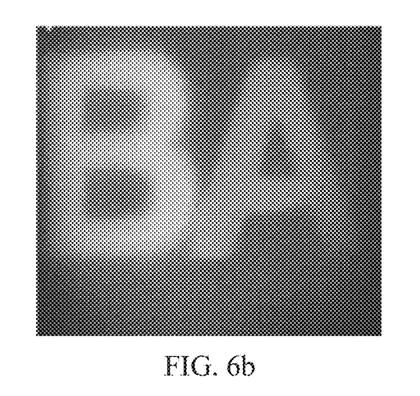

FIG. 6a and FIG. 6b are schematic diagrams of dual-focal-plane imaging according to this application. In actual application, one of focal planes may be fixed, and a focal length of a Fresnel lens may be arbitrarily adjusted to construct two adjustable focal planes. FIG. 6a shows an image generated when the letter A and the letter B are on different focal planes. The letter A is clearer than the letter B. In this case, to clearly observe both the letter A and the letter B, the letter A and the letter B may be separately imaged on different imaging screens (tier example, the imaging screen 331 and the imaging screen 332). FIG. 6b shows an image generated when the letter A and the letter B are on a same focal plane. Definition of the letter A and definition of the letter B are approximately the same. In this case, both the letter A and the letter B can be clearly observed on a same imaging screen (for example, the imaging screen 331).

Figure 7:
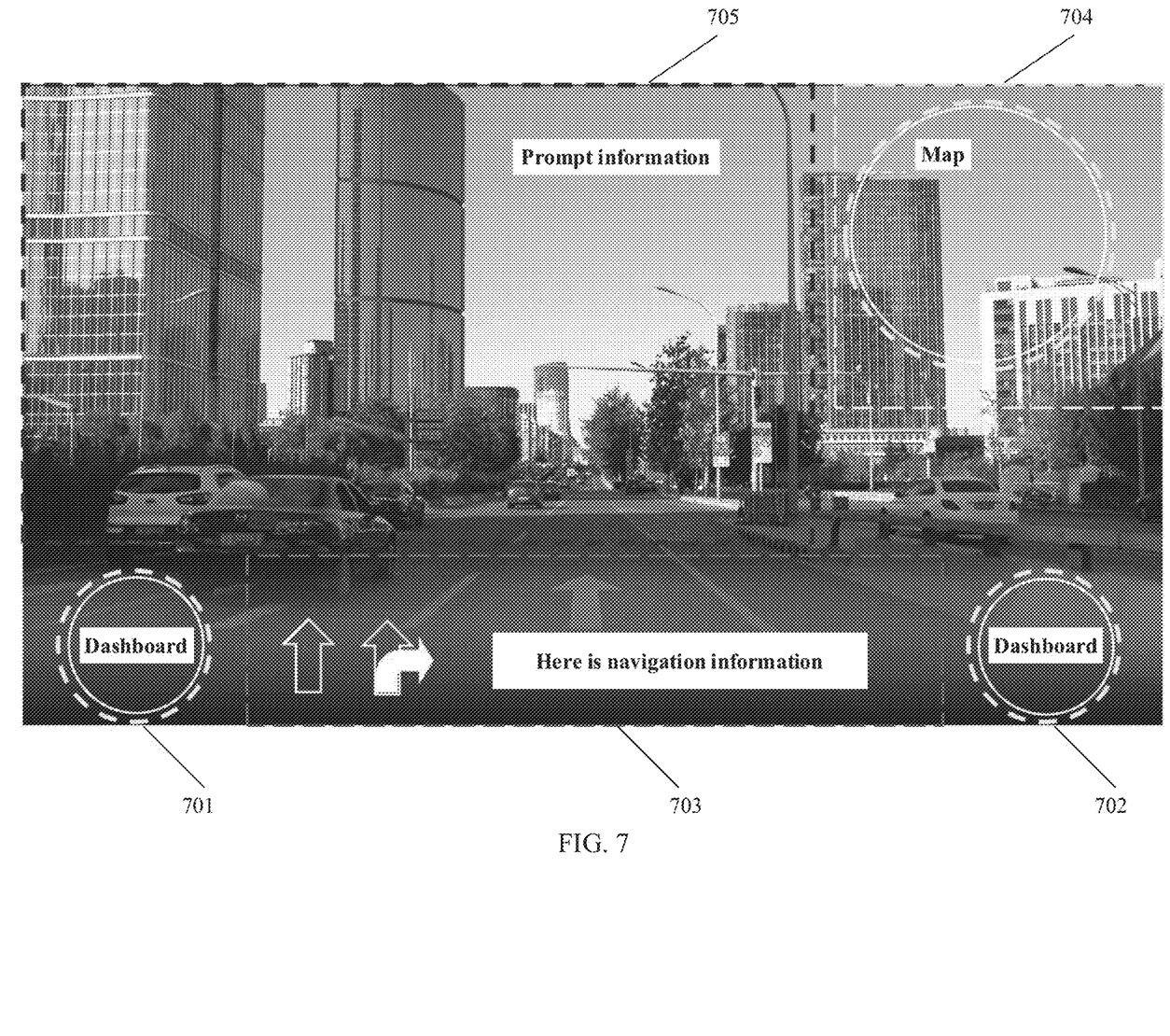
FIG. 7 is a schematic diagram of an imaging plane area division manner according to this application.

FIG. 7 is a schematic diagram of an imaging plane area division manner according to this application. As shown in FIG. 7, a spatial position in front of a human eye may be divided into a plurality of imaging plane areas, and different imaging plane areas may be located in different spatial positions. A surface area of the spatial light modulator is divided in a manner similar to that shown in FIG. 5a to FIG. 5d, and different phase distributions are loaded in different areas, so that different imaging planes (or focal planes) are generated. For example, a dashboard 701 and a dashboard 702 are imaged 30 cm to 40 cm in front of the human eye, navigation information 703 is imaged 2 meters to 3 meters in front of the human eye, a map 704 is imaged 3 meters to 5 meters in front of the human eye, and prompt information (such as weather and a surrounding building) 705 is imaged 5 meters to 10 meters in front of the human eye. Area division is performed on the surface of the spatial light modulator, and different phase distributions are loaded in different areas, so that images on different focal planes are displayed in different areas.

In this embodiment of this application, the spatial light modulator loads different phase information through area division, to control a quantity of focal planes and a position of the focal plane, so that flexibility is high.

Figure 8:
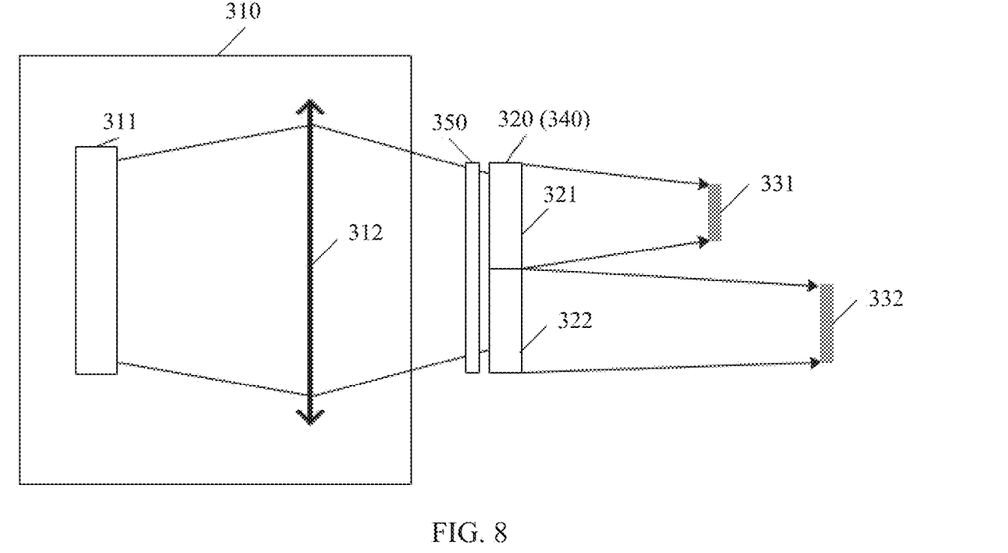
FIG. 8 is a schematic diagram of a structure of another multi-focal-plane image generation apparatus according to this application.

FIG. 8 is a schematic diagram of a structure of another multi-focal-plane image generation apparatus according to this application. As shown in FIG. 8, a difference from the embodiment shown in FIG. 3 is that a position of the spatial light modulator 320 is at the imaging plane 340 of the PGU module 310. In this case, parts of an image generated by the PGU module 310 may be observed on the imaging screen 331 and the imaging screen 332. Image demarcation of different parts depends on imaging area division of the spatial light modulator 320. For example, the image generated by the PGU module 310 includes the letter A and the letter B, the letter A is observed on the imaging screen 331, and the letter B is observed on the imaging screen 332. In the embodiment in FIG. 3, both the letter A and the letter B may be observed on each of the imaging screen 331 and the imaging screen 332.

Figure 9:
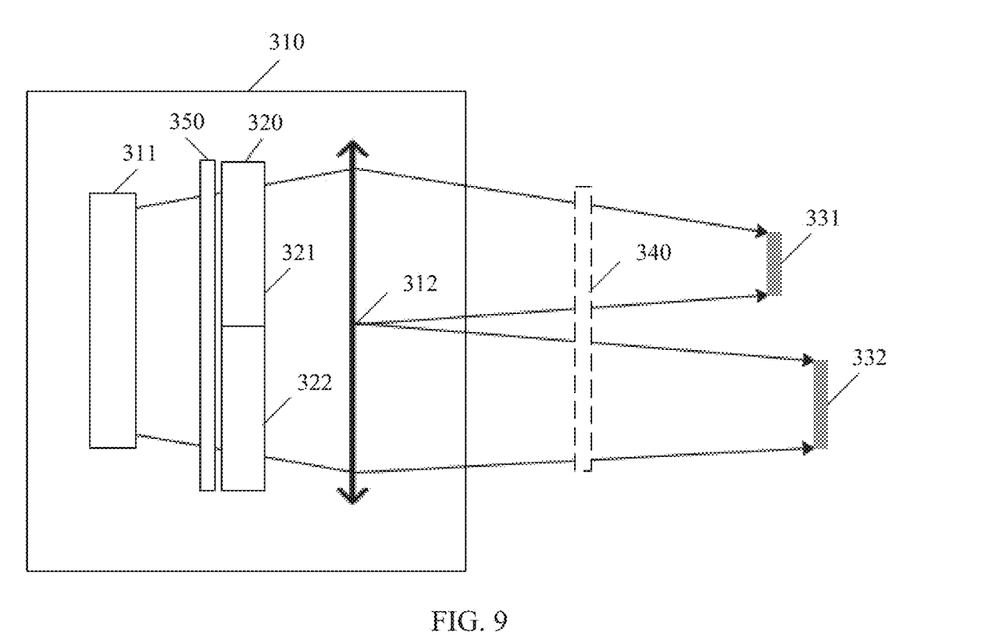
FIG. 9 is a schematic diagram of a structure of still another multi-focal-plane image generation apparatus according to this application.

FIG. 9 is a schematic diagram of a structure of still another multi-focal-plane image generation apparatus according to this application. As shown in FIG. 9, a difference from the embodiment shown in FIG. 3 is that a position of the spatial light modulator 320 is inside the PGU module 310. Optionally, the spatial light modulator 320 may be disposed in front of the imaging component 312, or behind the imaging component 312. Similar to that in the embodiment in FIG. 7, parts of an image generated by the PGU module 310 may be observed on the imaging screen 331 and the imaging screen 332. Image demarcation of different parts depends on imaging area division of the spatial light modulator 320.

In this embodiment of this application, the spatial light modulator may be inserted at a plurality of positions inside or outside the pattern generation unit, transformation and upgrade may be performed based on an optical path of the pattern generation unit, and implementation is simple. A focal length is flexibly adjusted by using the spatial light modulator, so that any focal length can be continuously adjusted, and any quantity of focal planes (or imaging planes) at any position can be implemented.

Figure 10:
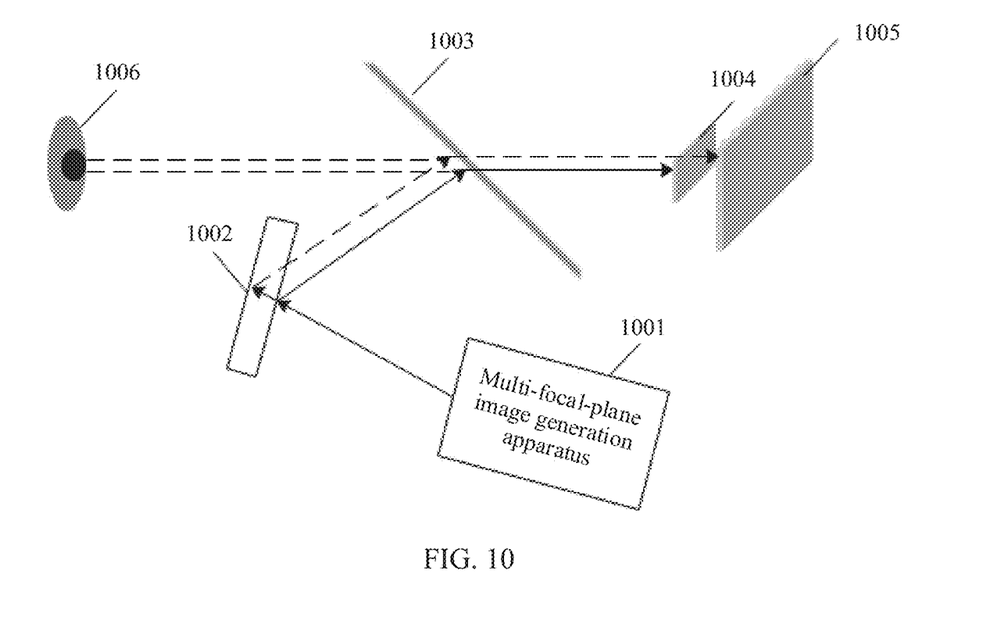
FIG. 10 is a schematic diagram of a structure of an HUD according to this application.

The multi-focal-plane image generation apparatus in embodiments of this application may be applied to display devices such as an HUD, a projector, and a flat glass display. The HUD is used as an example for description. FIG. 10 is a schematic diagram of a structure of an HUD according to this application. As shown in FIG. 10, the HUD may include a multi-focal-plane image generation apparatus 1001 in any one of the foregoing embodiments and an imaging screen 1002. The multi-focal-plane image generation apparatus 1001 has a plurality of focal planes, and is configured to generate a plurality of images; and different images are formed on different focal planes. The imaging screen 1002 may include a diffusing screen, a curtain, white paper, or the like. The imaging screen 1002 is disposed at a position of a focal plane, and is configured to receive images that are on different focal planes and that are generated by the image generation apparatus 1001. Images on different focal planes may be received through one imaging screen, or images on a plurality of focal planes may be separately received through a plurality of imaging screens (one imaging screen corresponds to one focal plane). Optionally, an optical element such as an optical path folding mirror or a reflector may be disposed behind the imaging screen 1002, to project a light beam reflected by an imaging plane on the imaging screen onto a windshield 1003, so that virtual images (or images) 1004 and 1005 formed on the windshield are received by a human eye 1006. A focal length of the multi-focal-plane image generation apparatus 1001 can be continuously adjusted, so that different imaging planes are generated at different positions on a same imaging screen or on a plurality of imaging screens at different positions, and finally images at different distances are observed by the human eye.

The HUD provided in this application may be applied to a driving device such as a vehicle, a bus, or an aircraft, or may be applied to a plurality of AR display scenarios. When the HUD is applied to the driving device, the HUD may be installed in a cockpit of the driving device, and an image generated by the HUD is reflected to a human eye through a windshield of the driving device.

The multi-focal-plane image generation apparatus in embodiments of this application is applied to the HUD, so that a focal length of the HUD can be continuously adjusted. Different information is presented on different imaging planes, and a user does not need to adjust a focus frequently in a driving process, improving user experience. In the descriptions of this specification, the specific features, structures, materials, or characteristics may be combined in a proper manner in any one or more embodiments or examples.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An image generation apparatus, wherein the apparatus comprises a pattern generation device and a focal length adjuster, and wherein:
the pattern generation device is configured to:
generate a light beam that carries image information; and
irradiate the light beam to a surface of the focal length adjuster; and
the focal length adjuster is configured to perform focal length adjustment on the light beam that is irradiated to the surface of the focal length adjuster to generate a plurality of focal planes of the image generation apparatus.

2. The image generation apparatus according to claim 1, wherein the focal length adjuster loads different phase information to generate the plurality of focal planes, wherein the different phase information corresponds to different focal planes.

3. The image generation apparatus according to claim 2, wherein the phase information that is loaded by the focal length adjuster comprises a phase distribution of a Fresnel lens or a phase distribution of a Zernike lens.

4. The image generation apparatus according to claim 1, wherein the focal length adjuster comprises a plurality of imaging areas, and different imaging areas correspond to different focal planes.

5. The image generation apparatus according to claim 4, wherein phase information that is loaded in the different imaging areas is different.

6. The image generation apparatus according to claim 4, wherein at least one of a quantity, shapes, or focal lengths of the plurality of imaging areas is configurable.

7. The image generation apparatus according to claim 1, wherein the focal length adjuster is disposed behind an imaging plane of the pattern generation device, or the focal length adjuster is disposed at an imaging plane of the pattern generation device, or the focal length adjuster is disposed in front of an imaging plane of the pattern generation device.

8. The image generation apparatus according to claim 1, wherein the focal length adjuster is a spatial light modulator.

9. The image generation apparatus according to claim 1, wherein a polarizer is disposed in front of the focal length adjuster, and the polarizer is configured to align a polarization state of the light beam with a direction of an alignment layer of the focal length adjuster.

10. An image generation method, wherein the method is applied to an image generation apparatus, and the image generation apparatus comprises a pattern generation device and a focal length adjuster, and wherein the method comprises:
generating, by using the pattern generation device, a light beam that carries image information;
irradiating the light beam to a surface of the focal length adjuster; and
performing, by using the focal length adjuster, focal length adjustment on the light beam that is irradiated to the surface of the focal length adjuster to generate a plurality of focal planes of the image generation apparatus.

11. The method according to claim 10, wherein the performing focal length adjustment on the light beam that is irradiated to the surface of the focal length adjuster to generate a plurality of focal planes of the image generation apparatus comprises:
loading different phase information on the focal length adjuster to allow the image generation apparatus to generate the plurality of focal planes, wherein the different phase information corresponds to different focal planes.

12. The method according to claim 11, wherein the phase information that is loaded by the focal length adjuster comprises a phase distribution of a Fresnel lens or a phase distribution of a Zernike lens.

13. The method according to claim 10, wherein the method comprises:
dividing the focal length adjuster into a plurality of imaging areas, wherein different imaging areas correspond to different focal planes.

14. The method according to claim 13, wherein the method further comprises:
loading different phase information in the different imaging areas.

15. The method according to claim 13, wherein at least one of a quantity, shapes, or focal lengths of the plurality of imaging areas is configurable.

16. The method according to claim 10, wherein the focal length adjuster is a spatial light modulator.

17. The method according to claim 10, wherein a polarization state of the light beam is aligned with a direction of an alignment layer of the focal length adjuster through a polarizer, and the polarizer is disposed in front of the focal length adjuster.

18. A display apparatus, wherein the display apparatus comprises an image generation apparatus and an image component, and wherein:
the image generation apparatus is configured to generate a plurality of images, wherein the image generation apparatus has a plurality of focal planes, and different focal planes correspond to different images in the plurality of images, wherein the image generation apparatus comprises a pattern generation device and a focal length adjuster, and wherein:
the pattern generation device is configured to:
generate a light beam that carries image information; and
irradiate the light beam to a surface of the focal length adjuster; and
the focal length adjuster is configured to perform focal length adjustment on the light beam that is irradiated to the surface of the focal length adjuster to generate the plurality of focal planes of the image generation apparatus; and
the image component is configured to perform imaging for the plurality of images.

19. The display apparatus according to claim 18, wherein the display apparatus is comprised in a driving device, wherein the driving device further comprises a cockpit and a windshield that is installed in front of the cockpit, wherein the display apparatus is installed in the cockpit, and wherein the windshield performs reflection and imaging on an image that is generated by the display apparatus.

20. The display apparatus according to claim 18, wherein the focal length adjuster loads different phase information to generate the plurality of focal planes, wherein the different phase information corresponds to different focal planes.

* * * * *

UNITED STATES PATENT AND TRADEMARK OFFICE
CERTIFICATE OF CORRECTION

| | | |
|---|---|---|
| PATENT NO. | : 12,055,712 B2 | Page 1 of 1 |
| APPLICATION NO. | : 17/986381 | |
| DATED | : August 6, 2024 | |
| INVENTOR(S) | : Lei Mao et al. | |

It is certified that error appears in the above-identified patent and that said Letters Patent is hereby corrected as shown below:

In the Claims

In Column 9, In Line 36, In Claim 5, after "wherein" insert -- the --.

Signed and Sealed this
Twenty-sixth Day of November, 2024

Katherine Kelly Vidal
*Director of the United States Patent and Trademark Office*